J. M. VAN DERZEE.
BALE-TIES.

No. 195,857.   Patented Oct. 2, 1877.

WITNESSES.
J. Wm. Garner
Will. H. Kern

INVENTOR.
Jno. M. Van Derzee
per
F. A. Lehmann,
atty

UNITED STATES PATENT OFFICE.

JOHN M. VAN DERZEE, OF NEW BALTIMORE, NEW YORK.

IMPROVEMENT IN BALE-TIES.

Specification forming part of Letters Patent No. 195,857, dated October 2, 1877; application filed September 5, 1877.

*To all whom it may concern:*

Be it known that I, JOHN M. VAN DERZEE, of New Baltimore, in the county of Greene and State of New York, have invented certain new and useful Improvements in Ties for Baling Hay and Straw; and I do hereby declare the following to be a full, clear, and exact description of the invention, such as will enable others skilled in the art to which it pertains to make and use it, reference being had to the accompanying drawings, which form part of this specification.

My invention relates to an improvement in ties for baling hay and straw; and it consists in the arrangement and combination of parts that will be more fully described hereinafter.

Figure 1:
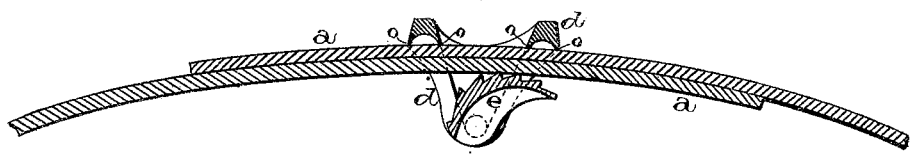
Figure 2:
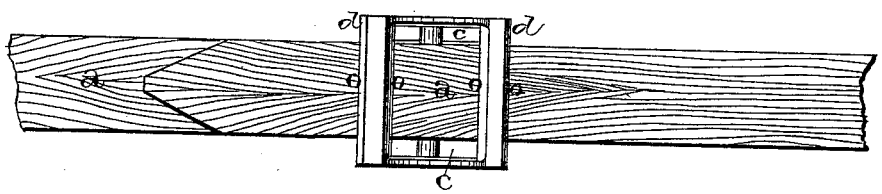
Figure 3:
Figure 4:
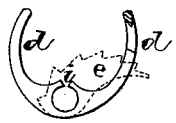
Figure 5:
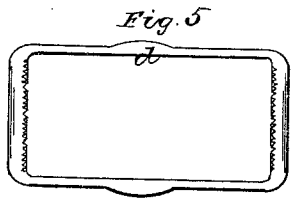

Figure 1 is a vertical section of my invention. Fig. 2 is a plan view of the same. Figs. 3, 4, and 5 are detail views of a modification of the frame.

Heretofore wires have been used in baling hay and straw, and, owing to the fact that they are so thin and narrow, they cut into the sides of the bales, and allow them to bulge outward and increase considerably in size after they leave the press. In order to prevent this bulging outward additional wires are bound around the bale, thus adding very materially to the cost of baling. Iron bands cannot be used for this purpose for several reasons, one of which is their cost.

After a series of experiments, I have found that wooden bands can be used for this purpose as efficiently as the iron bands can be used upon cotton bales, and that, too, at a great saving in cost.

$a\ a$ represent the ends of my wooden band, which is made of any suitable length, breadth, and thickness required, but which should be as light as possible. These bands, being much wider than the wires, prevent all bulging of the bale after it leaves the press, and, therefore, a smaller number of the wooden bands can be used to each bale.

The tie for binding the ends of the bands together around the bales consists of the frame $d$ and the serrated clamp $e$.

When the frame is made of cast-iron, it will be triangular in shape, as shown in Fig. 1, and its center will be recessed out, so as to form a bearing for the journals of the clamp. By means of this recess $c$ the clamp can be removed at will.

Those edges of the frames that come in contact with the wooden bands are sharp, so as to bite into their surfaces, and thus while one end of the band is held by the frame the other is held by the clamp.

The clamp $e$ is made cam-shaped, and has that edge which comes in contact with the surface of the band made serrated, as shown, so that the tighter the band is drawn the deeper the serrations cut into its surface, and the tighter it is held.

Where it is desired to make the frame $d$ as light as possible, it will be cast of malleable iron, in the form shown in Fig. 3, with the projections $i$ upon one of its edges. The journals of the clamp are then laid in between these projections, and the ends bent toward each other, as shown in Fig. 4, until the ends of the projections meet over the top of the journals of the clamp.

By this construction the frame and the clamp are bound together, and the tie is made very light.

The two ends of the bands pass each other in passing through the tie, and when the expansive force of the bale is brought to bear upon the band the two ends are forced tightly together by the shape of the clamp, and while one end is prevented from slipping by the clamp the other is held by the sharp edges $o$ of the frame.

Of course my wooden bands can be used in baling other substances, such as cotton, hemp, and tobacco, but is specially adapted for hay and straw.

Having thus described my invention, I claim—

In combination with the wooden bands $a$, the metallic tie, consisting of the frame $d$ having sharp cutting edge or edges $o$, recess $c$, and serrated cam $e$, whereby one end of the band is held by the frame and the other by the cam, substantially as shown and described.

In testimony that I claim the foregoing I have hereunto set my hand this 5th day of September, 1877.

JOHN M. VAN DERZEE.

Witnesses:
 F. A. LEHMANN,
 W. H. KERN.